US012462335B2

United States Patent
Yan et al.

(10) Patent No.: US 12,462,335 B2
(45) Date of Patent: Nov. 4, 2025

(54) SYSTEMS AND METHODS FOR MULTI-MODAL MULTI-DIMENSIONAL IMAGE REGISTRATION

(71) Applicant: Rensselaer Polytechnic Institute, Troy, NY (US)

(72) Inventors: Pingkun Yan, Clifton Park, NY (US); Hengtao Guo, Troy, NY (US); Xinrui Song, Troy, NY (US); Xuanang Xu, Troy, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 417 days.

(21) Appl. No.: 18/092,531

(22) Filed: Jan. 3, 2023

(65) Prior Publication Data

US 2023/0281751 A1 Sep. 7, 2023

Related U.S. Application Data

(60) Provisional application No. 63/316,096, filed on Mar. 3, 2022.

(51) Int. Cl.
*G06T 3/14* (2024.01)
*G06T 7/33* (2017.01)

(52) U.S. Cl.
CPC ............... *G06T 3/14* (2024.01); *G06T 7/337* (2017.01); *G06T 2207/10088* (2013.01);
(Continued)

(58) Field of Classification Search
None
See application file for complete search history.

(56) References Cited

U.S. PATENT DOCUMENTS

| 7,653,264 B2 | 1/2010 | Hero et al. |
| 8,090,429 B2 | 1/2012 | Vija et al. |

(Continued)

FOREIGN PATENT DOCUMENTS

| CN | 112149459 A | * 12/2020 | ............. G06V 20/41 |
| CN | 114066954 A | * 2/2022 | ............. G06F 18/22 |
| WO | WO-2022197367 A1 | * 9/2022 | |

OTHER PUBLICATIONS

G. Samei et al., "Real-Time FEM-Based Registration of 3-D to 2.5-D Transrectal Ultrasound Images," in IEEE Transactions on Medical Imaging, vol. 37, No. 8, pp. 1877-1886, Aug. 2018, doi: 10.1109/TMI.2018.2810778.*

(Continued)

*Primary Examiner* — Jiangeng Sun
(74) *Attorney, Agent, or Firm* — Barclay Damon LLP; Anthony P. Gangemi

(57) ABSTRACT

A method of multi-modal image registration is provided. The method includes receiving as input a fixed image from a first imaging device, receiving as input a moving image from a second imaging device, performing feature extraction on the fixed image via a first feature extractor to generate a fixed image feature map, performing feature extraction on the moving image via second feature extractor to generate a moving image feature map, performing cross-modal attention on the fixed image feature map and the moving image feature map to generate cross-modal feature attention data, performing deep registration on the cross-modal feature attention data via a deep registrator, and outputting a multi-modal registered image.

15 Claims, 8 Drawing Sheets

(52) U.S. Cl.
CPC ............... *G06T 2207/10132* (2013.01); *G06T 2207/20084* (2013.01); *G06T 2207/20221* (2013.01)

(56) References Cited

U.S. PATENT DOCUMENTS

| | | | |
|---|---|---|---|
| 8,270,691 | B2 | 9/2012 | Xu et al. |
| 8,675,935 | B2 | 3/2014 | Higgins et al. |
| 8,855,442 | B2 | 10/2014 | Owechko |
| 9,135,706 | B2 | 9/2015 | Zagorchev et al. |
| 9,165,362 | B2 | 10/2015 | Siewerdsen et al. |
| 9,418,468 | B2 | 8/2016 | Paragios et al. |
| 9,471,978 | B2 | 10/2016 | Chen et al. |
| 10,043,272 | B2 | 8/2018 | Forzoni et al. |
| 10,105,115 | B2 | 10/2018 | McCabe et al. |
| 10,368,947 | B2 | 8/2019 | Lang |
| 10,460,491 | B2 | 10/2019 | Paragios et al. |
| 10,614,634 | B2 | 4/2020 | Yu et al. |
| 10,636,142 | B2 | 4/2020 | Mansi et al. |
| 10,691,977 | B2 | 6/2020 | Kim et al. |
| 10,713,801 | B2 | 7/2020 | Jordan et al. |
| 10,754,928 | B2 | 8/2020 | Chen et al. |
| 10,762,398 | B2 | 9/2020 | Sjolund et al. |
| 10,796,403 | B2 | 10/2020 | Choi et al. |
| 10,842,445 | B2 | 11/2020 | Wang et al. |
| 10,885,399 | B2 | 1/2021 | Zhou et al. |
| 2003/0174872 | A1* | 9/2003 | Chalana ................. G16H 50/70 382/128 |
| 2006/0257027 | A1* | 11/2006 | Hero ................... G06F 18/2413 382/190 |
| 2014/0192046 | A1* | 7/2014 | Paragios ............... G06T 15/005 345/419 |
| 2020/0211208 | A1 | 7/2020 | Wen et al. |
| 2020/0410696 | A1 | 12/2020 | Yan et al. |
| 2022/0261590 | A1* | 8/2022 | Brahma ................. G06V 20/56 |
| 2022/0327809 | A1* | 10/2022 | Li ........................ G06F 40/284 |
| 2023/0081171 | A1* | 3/2023 | Zhang ..................... G06T 11/00 382/157 |

OTHER PUBLICATIONS

X. Yin, W. Qian, D. Xu, R. Nie and J. Zhang, "An Unsupervised Dual Attention Method for 3D Medical Image Registration," 2021 7th International Conference on Computer and Communications (ICCC), Chengdu, China, 2021, pp. 975-979, doi: 10.1109/ICCC54389.2021.9674730.*

* cited by examiner

SYSTEMS AND METHODS FOR MULTI-MODAL MULTI-DIMENSIONAL IMAGE REGISTRATION

CROSS REFERENCE TO RELATED APPLICATION(S)

This application claims the priority benefit of U.S. Provisional Patent Application No. 63/316,096, filed Mar. 3, 2022, which is incorporated by reference as if disclosed herein in its entirety.

STATEMENT REGARDING FEDERALLY SPONSORED RESEARCH AND DEVELOPMENT

The present invention was made with government support under Grant No. EB028001 awarded by the National Institutes of Health. The government has certain rights in the invention.

FIELD

The present technology relates generally to the field of image registration, and more particularly, to end-to-end machine learning based multi-modal multi-dimensional image registration.

BACKGROUND

An image-guided intervention uses computerized algorithms to provide virtual guidance to physicians to precisely reach and treat their targets in a clinical procedure. Physicians need to use more than one complimentary imaging modalities to achieve their clinical goals in many applications. For example, the fusion of magnetic resonance imaging ("MRI") and transrectal ultrasound ("TRUS") for guiding targeted prostate biopsies has led to improving the biopsy yield by more than 30%. Liver cancer interventions often use computed tomography ("CT") fusion with ultrasound imaging to provide real-time guidance to deliver treatment. In such applications, image registration is a critical technical component to achieve the desired clinical goals. The value of fusion guided procedures vanishes if the quality of image registration degrades.

Registration of multi-modal images is a very challenging problem. In the above examples, the fusion between MRI and ultrasound images is required. However, similar anatomical structures could have significantly different intensities, textures, and levels of detail in these two imaging modalities. Existing technologies attempt to find the anatomical correspondence between imaging modalities via deep neural networks centered around convolutional layers, a structure sensitive to intensity and texture differences. However, such existing technologies involve complex neural networks that are inefficient and result in high levels of error.

The dimensionality difference further complicates the problem. In the above examples, ultrasound imaging typically acquires two-dimensional ("2D") images, but the other preoperative diagnostic imaging modalities like MRI and CT generate three-dimensional ("3D") images. Fusing 2D ultrasound images with 3D MRI or CT images requires multi-modal multi-dimensional image registration. Existing technology deals with such difficulties using external hardware tracking systems, such as electromagnetic tracking or optical tracking.

Currently available 2D/3D image registration techniques, sometimes referred to as slice-to-volume registration methods, iteratively optimize a similarity metric by adjusting a transformation to align the input images. Such methods require manually defining a similarity metric for optimization. Because of the nature of iterative optimization, their efficiencies are low and thus are not suitable for intra-procedural interventional use.

Thus, a need exists for improved systems and methods of end-to-end multi-modal multi-dimensional image registration that address at least the problems described above.

SUMMARY

According to an embodiment of the present technology, a method of multi-modal image registration is provided. The method includes receiving as input a fixed image from a first imaging device, receiving as input a moving image from a second imaging device, performing feature extraction on the fixed image via a first feature extractor to generate a fixed image feature map, performing feature extraction on the moving image via second feature extractor to generate a moving image feature map, performing cross-modal attention on the fixed image feature map and the moving image feature map to generate cross-modal feature attention data, performing deep registration on the cross-modal feature attention data via a deep registrator, and outputting a multi-modal registered image.

In some embodiments, the first imaging device is a magnetic resonance imaging ("MRI") device, and the fixed image is an MRI volume of a subject.

In some embodiments, the second imaging device is an ultrasound device, and the moving image is a transrectal ultrasound volume of a subject.

In some embodiments, performing the cross-modal attention includes inputting the fixed image feature map as a primary input into a first cross-modal attention block and inputting the moving image feature map as a cross-modal input into the first cross-modal attention block to generate a first cross-modal attention block output, inputting the moving image feature map as a primary input into a second cross-modal attention block and inputting the fixed image feature map as a cross-modal input into the second cross-modal attention block to generate a second cross-modal attention block output, inputting the first cross-modal attention block output into a common convolution layer to generate a first cross-modal attention convolution output, inputting the second cross-modal attention block output into the common convolution layer to generate a second cross-modal attention convolution output, and performing element-wise addition on the first cross-modal attention convolution output and the second cross-modal attention convolution output to generate the cross-modal feature attention data.

In some embodiments, each of the first cross-modal attention block and the second cross-modal attention block are configured to perform a first matrix multiplication of the primary input and the cross-modal input to generate a first matrix output, perform a second matrix multiplication of the primary input and the first matrix output to generate a second matrix output, and perform a concatenation of the cross-modal input and the second matrix output to generate the respective cross-modal attention block output.

In some embodiments, the concatenation includes a plurality of channels, and features of the fixed image feature map are arranged in a first half of the plurality of channels and features of the moving image feature map are arranged in a last half of the plurality of channels.

In some embodiments, the deep registrator is configured to perform rigid deep registration on the cross-modal feature attention data to generate an estimated transformation data. The deep registrator includes a rectified linear unit, two convolution blocks, and three fully connected layers.

In some embodiments, the method further includes performing a rigid registration implementation on the estimated transformation data to generate the multi-modal registered image.

In some embodiments, each of the first feature extractor and the second feature extractor include two convolution blocks.

In some embodiments, each convolution block includes a convolution layer and a batch normalization and rectified linear unit layer.

In some embodiments, the deep registrator is configured to perform deformable deep registration on the cross-modal feature attention data to generate a predicted deformation field. The deep registrator includes a rectified linear unit, a first convolution block, a second convolution block, and a convolution layer.

In some embodiments, each of the first feature extractor and the second feature extractor include a first convolution block, a second convolution block, and a third convolution block. Performing the deep registration further includes performing a first channel-wise concatenation of the outputs of the third convolution blocks of the first feature extractor and the second feature extractor, inputting the output of the first channel-wise concatenation through a first intermediate convolution layer, and performing a second channel-wise concatenation of the outputs of the first intermediate convolution layer and the rectified linear unit of the deep registrator.

In some embodiments, performing the deep registration further includes performing a third channel-wise concatenation of the outputs of the second convolution blocks of the first feature extractor and the second feature extractor, inputting the output of the third channel-wise concatenation through a second intermediate convolution layer, and performing a fourth channel-wise concatenation of the outputs of the second intermediate convolution layer and the first convolution block of the deep registrator.

In some embodiments, each convolution block includes a first convolution layer, a first batch normalization and rectified linear unit layer, a second convolution layer, and a second batch normalization and rectified linear unit layer.

In some embodiments, the method further includes performing a deformable registration implementation on the predicted deformation field to generate the multi-modal registered image.

According to another embodiment of the present technology, a method of multi-modal multi-dimensional image registration is provided. The method includes receiving as input a first 2D ultrasound image; receiving as input a reconstructed 3D ultrasound volumetric image; generating a fused feature map based on the 2D ultrasound image and the 3D ultrasound volume; processing the fused feature map in a spatial transformation network ("STN") to train an end-to-end multi-dimensional image registration; receiving as input in real-time a second 2D ultrasound image; receiving as input a 3D magnetic resonance imaging ("MRI") volumetric image; and aligning, via the end-to-end multi-dimensional image registration, the second 2D ultrasound image in real-time to the 3D MRI volumetric image to output a multi-modal multi-dimensional image registration.

In some embodiments, generating the fused feature map includes extracting a first plurality of low-level features from the first 2D ultrasound image via a plurality of 2D convolutional layers, extracting a second plurality of low-level features from the 3D ultrasound volumetric image via a plurality of 3D convolutional layers, and concatenating the first plurality of low-level features with the second plurality of low-level features in a late-fusion fashion.

In some embodiments, the STN includes a localization network, a grid generator, and an image sampler. The localization network is configured to determine the spatial relationships between the fused features of the first 2D ultrasound image and the 3D ultrasound volumetric image of the fused feature map. The grid generator is configured to generate a transformed sampling grid. The image sampler is configured to sample a target 2D plane from the 3D ultrasound volumetric image.

In some embodiments, the end-to-end multi-dimensional image registration is trained without the use of image tracking information.

Further objects, aspects, features, and embodiments of the present technology will be apparent from the drawing Figures and below description.

BRIEF DESCRIPTION OF DRAWINGS

Some embodiments of the present technology are illustrated as an example and are not limited by the figures of the accompanying drawings, in which like references may indicate similar elements.

DETAILED DESCRIPTION

Figure 1:
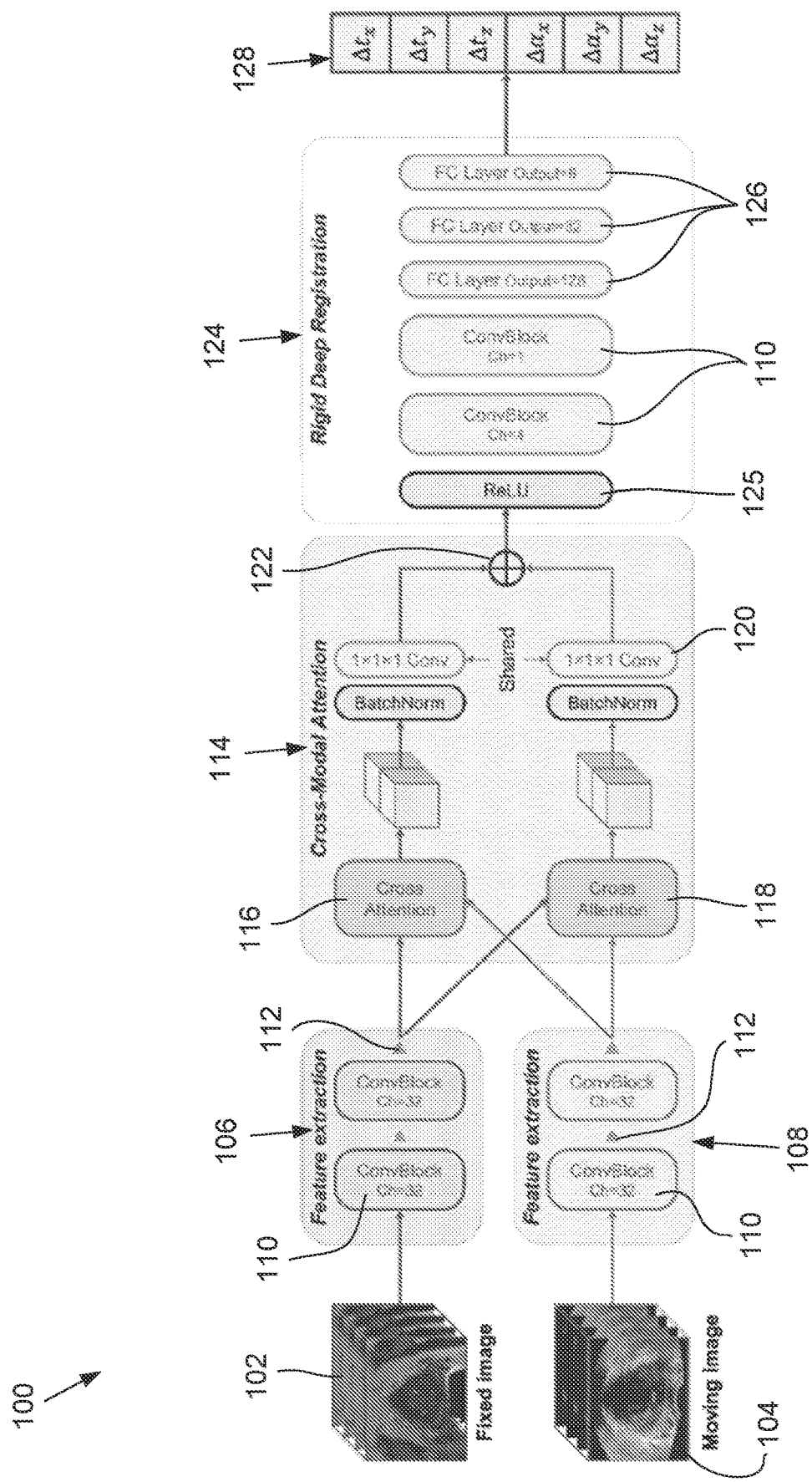
FIG. 1 is a flowchart schematic view of a multi-modal image registration network according to an exemplary embodiment of the present technology.

As shown in FIG. 1, a method of multi-modal image registration according to an exemplary embodiment of the present technology is generally designated by the numeral 100. The method 100 includes a fixed image 102 received from a first imaging device and a moving image 104 received from a second imaging device. In some embodiments, the first imaging device is an MRI device, and the fixed image is an MRI volume of a subject imaged by the MRI device. In some embodiments, the second imaging device is an ultrasound device, and the moving image is a transrectal ultrasound ("TRUS") volume of the subject. A first feature extractor 106 performs feature extraction on the fixed image 102 to generate a fixed image feature map. A second feature extractor 108 performs feature extraction on the moving image 104 to generate a moving image feature map. Each of the first and second feature extractors 106, 108 include convolution blocks 110 and 2×2×2 max pooling layers 112.

Figure 2:
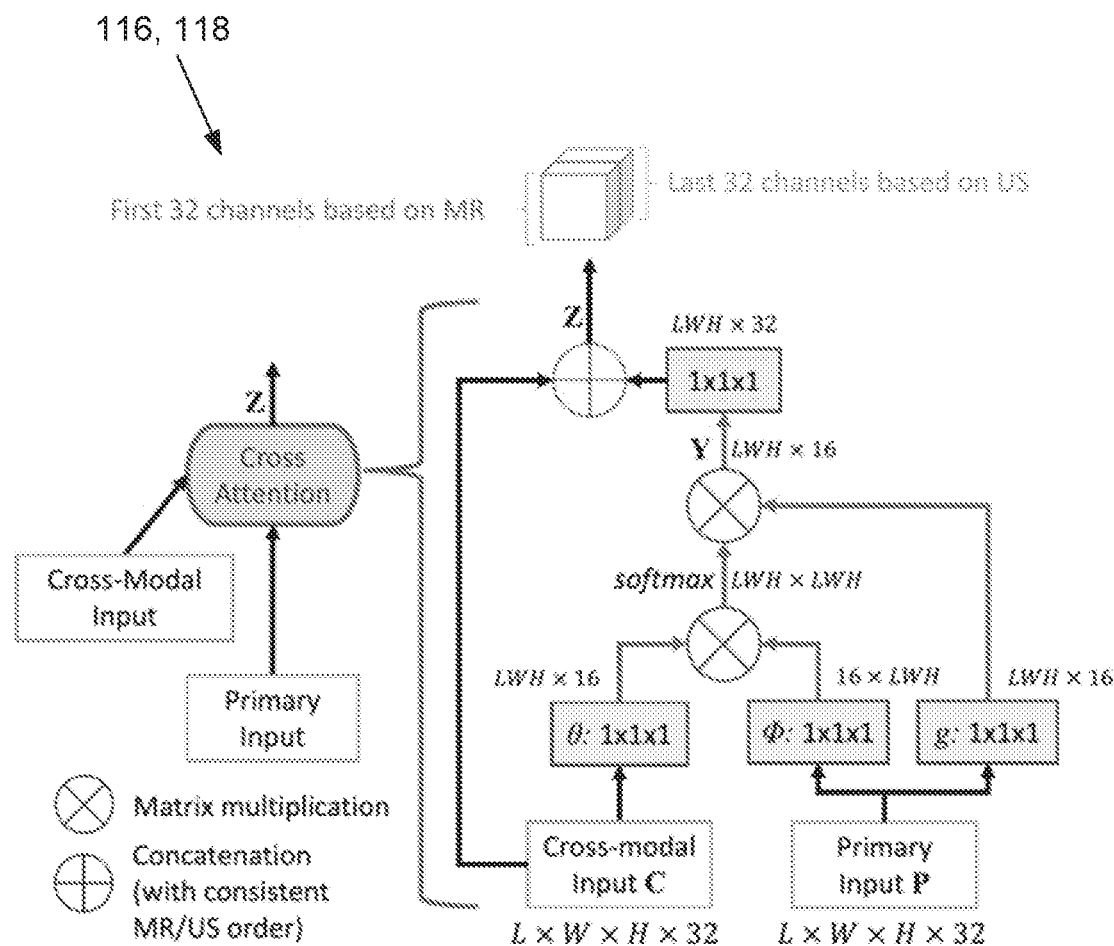
FIG. 2 is a flowchart schematic view of an exemplary cross-modal attention block of the registration network of FIG. 1.

The fixed and moving image feature maps are input to a cross-modal attention module 114 that is configured to generate cross-modal feature attention data. The cross-modal attention module 114 includes a first cross-modal attention block 116 and a second cross-modal attention block 118, the outputs of which are input into a common convolution layer 120 and are then combined via an element-wise addition layer 122. The first cross-modal attention block 116 receives the fixed image feature map as primary input P and receives the moving image feature map as cross-modal input C. The second cross-modal attention block 118 receives the moving image feature map as primary input P and receives the fixed image feature map as cross-modal input C. As shown in FIG. 2, each of the first and second cross-modal attention blocks 116, 118 are configured to perform a first matrix multiplication of the respective primary input P and the respective cross-modal input C to generate a first matrix output, perform a second matrix multiplication of the respective primary input P and the first matrix output to generate a second matrix output, and perform a concatenation of the respective cross-modal input C and the second matrix output to generate the respective cross-modal attention block output.

As shown in FIG. 1, the cross-modal feature attention data is input to a deep registrator 124 that is configured to perform rigid deep registration on the cross-modal attention data to generate estimated transformation data. The deep registrator 124 includes a rectified linear unit ("ReLU") 125, two convolution blocks 110, and three fully connected layers 126. The method 100 includes performing a rigid registration implementation 128 on the estimated transformation data to generate a multi-modal registered image. In the embodiment shown in FIG. 1, each convolution block 110 includes a convolution layer and a batch normalization and ReLU layer.

In some embodiments of method 100, an MRI volume is the fixed image and a TRUS volume is the moving image. The registration network consists of three main parts, as shown in FIG. 1. The feature extractor uses convolutional and max pooling layers to capture regional features from the input volumes. Then a cross-modal attention module is used to capture both local features and their global correspondence between modalities. Finally, this information is fed to the deep registrator, which further fuses information from the two modalities and infers the registration parameters.

The feature extraction module of the network is designed to extract high-level features that overcome the difference between modalities. Due to texture and intensity differences, two different feature extractors are used for each branch of input. For each branch, the input goes through iterations of convolution layer+normalization+ReLU and down-sampling.

The cross-modal attention block takes as input image features extracted from MR and TRUS volumes by the preceding convolutional layers. Unlike the prior art non-local block that computes self-attention on a single image, the cross-modal attention block of the present technology establishes spatial correspondences between features from two images in different modalities. FIG. 2 shows the inner structure of the cross-modal attention block.

The two input features maps of the block are denoted as primary input $P \in \mathbb{R}^{LW\ H \times channel}$ and cross-modal input $C \in \mathbb{R}^{LW\ H \times channel}$, respectively, where LW H indicates the size of each 3D feature channel after flattening. The block computes the cross-modal feature attention as $$a_{ij} = \frac{\exp\left(\theta(c_i)^T \phi(p_j)\right)}{\sum_{k=1}^{LWH} \exp\left(\theta(c_i)^T \phi(p_k)\right)} \quad (1)$$

and the attention weighted primary input as $$y_i = \Sigma_{j=1}^{LW\ H} a_{ij} g(p_j) \quad (2)$$

where $c_i$ and $p_j$ are features from C and P at location i and j, $\theta(\cdot)$, $\phi(\cdot)$, and $g(\cdot)$ are all linear embedding. In Eq. (1), the attention $a_{ij}$ is computed as a scalar representing correlations between the features of these two locations, $c_i$ and $p_j$. The attention weighted result $y_i$ is a normalized summary of features on all locations of P weighted by their correlations with the cross-modal feature on location i as shown in Eq. (2). Thus, the matrix Y composed by $y_i$ integrates non-local information from P to every position in C.

Finally, the attention block concatenates Y and C to obtain the output Z to allow efficient back-propagation and prevent potential loss of information. Preferably, the ordering of concatenation is arranged so that features based on MR are always in the first half channels of Z, and those from TRUS are always in the second half, thus ensuring that a common convolution layer can be used for the output of both attention blocks.

The cross-modal attention module uses the features extracted by the previous feature extraction module to compute the attention. In the early phase of the training, the extracted features may be irrelevant to the image registration task and thus the computed attention may not be correlated with the registration. The overall training can be highly inefficient. To address this issue, some embodiments of the present technology use a contrastive learning-based pre-training strategy that enforces the feature extractor module of the registration network to learn similar feature representations from corresponding anatomical regions from two modalities before the end-to-end training of the entire network.

Figure 3:
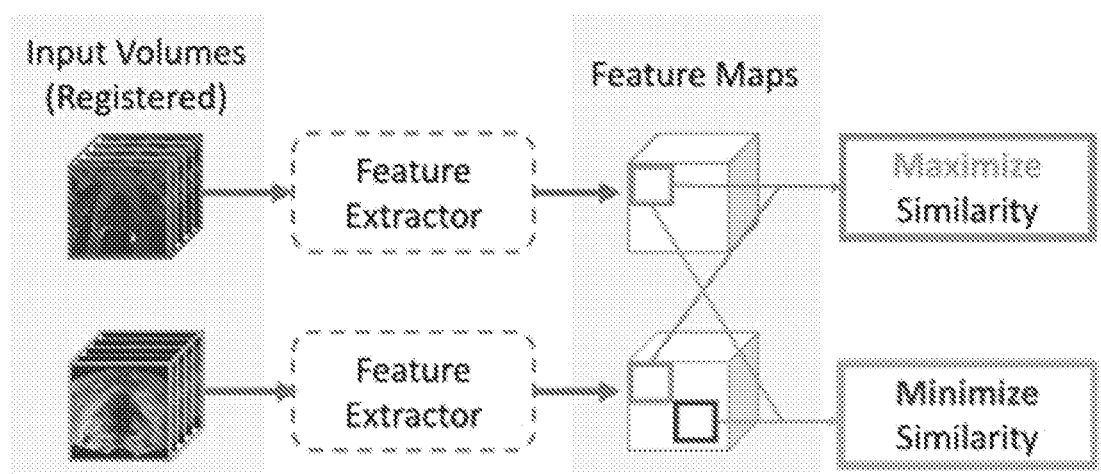
FIG. 3 is a flowchart schematic of a contrastive pre-training process for pre-training the feature extraction module of the registration network of FIG. 1.

FIG. 3 shows the contrastive learning-based pre-training process used in exemplary embodiments of the present technology. The ground-truth rigid registration between the MR and the TRUS images is provided. When the two images are aligned with the ground-truth transformation, image contents found at the same location in each of the volumes should represent similar anatomical structures. In principle, similar anatomical structures should produce similar feature vectors. Therefore, image contents found at the same location in each volume should produce similar feature vectors. Since aligned image volumes automatically produce aligned feature maps, the contrastive pre-training process aims to maximize the similarity between the feature vectors at the same location in each feature maps and minimize the similarity between feature vectors at different locations.

After the two aligned feature maps are obtained, the feature vectors are normalized using the L2-norm, and K pairs of corresponding points from the two feature maps are randomly selected. During the selection process, feature vectors that are outside of the fan-shaped field-of-view in the original ultrasound image are avoided. The selected feature vectors form two K×32 matrices, one for MR and the other for US, where 32 is the length of each feature vector. The two matrices are then multiplied to obtain a K×K cosine similarity map M. Since the feature maps are aligned, the task is to maximize the diagonal of M, and to minimize all other elements. Suppose each row of M represents the similarities between one MR feature vector and all TRUS features, and each column represents similarities between one TRUS feature vector and all MR features. For the MR feature at location i, Eq. (4) will force it to be close to the TRUS feature at the same location i and to be different from the TRUS features at other positions. Similarly, Eq. (5) imposes such a constrain on the TRUS feature at location i.

Iterating this loss across all rows and columns of M may be summarized with Eq. (3) below, $$L_{contrastive} = \frac{1}{2K}\sum_{i=0}^{K-1} L_{row}(i) + L_{column}(i) \quad (3)$$

where $$L_{row}(i) = -\log \frac{\exp(M_{i,i})}{\sum_{k=0}^{K-1} \exp(M_{i,k})} \quad (4)$$

and $$L_{column}(i) = -\log \frac{\exp(M_{i,i})}{\sum_{k=0}^{K-1} \exp(M_{i,k})} \quad (5)$$

In the row-wise and column-wise losses, $L_{row}(i)$ and $L_{column}(i)$, the numerators are the diagonal components $\{M_{i,i}, i=[0, K-1]\}$. Minimizing the combined contrastive loss will help achieve the effect of maximizing the correlation at the corresponding locations $M_{i,i}$ and minimizing the correlation $M_{i,j}$, ($i \neq j$) between patches from misaligned locations.

The deep registration module fuses the concatenated outputs of the two cross-modal attention blocks and predicts the transformation parameters for registration. Prior art methods have used very deep neural networks to automatically learn the complex features of inputs. However, since the cross-modal attention blocks of the present technology establish the spatial correspondence between the two sets of input volumes, the registration module can afford to be light weighted. Thus, only three convolutional layers are used to fuse the two feature maps. The final fully connected layers convert the learnt spatial information into an estimated transformation.

Some embodiments formulate the method as a rigid transformation task since it is one of the most commonly used registration forms in clinical practice for image-guided prostate intervention. The ground-truth registration labels used herein are acquired from the clinical procedures of image-fusion guided prostate biopsy. Rigid transformations herein are performed with 4×4 matrices generated from 6 transformation parameters $\theta = \{\Delta t_x, \Delta t_y, \Delta t_z, \Delta a_x, \Delta a_y, \Delta a_z\}$, which represent translations and rotations along the x, y, and z directions, respectively. The network training is supervised by calculating the Mean Squared Error ("MSE") between the prediction and the ground-truth parameters. In some embodiments, the feature extraction module is pre-trained as described above. The pre-trained module is then frozen to tune the rest of the network. After 300 epochs, the entire network is relaxed for fine-tuning.

Figure 4:
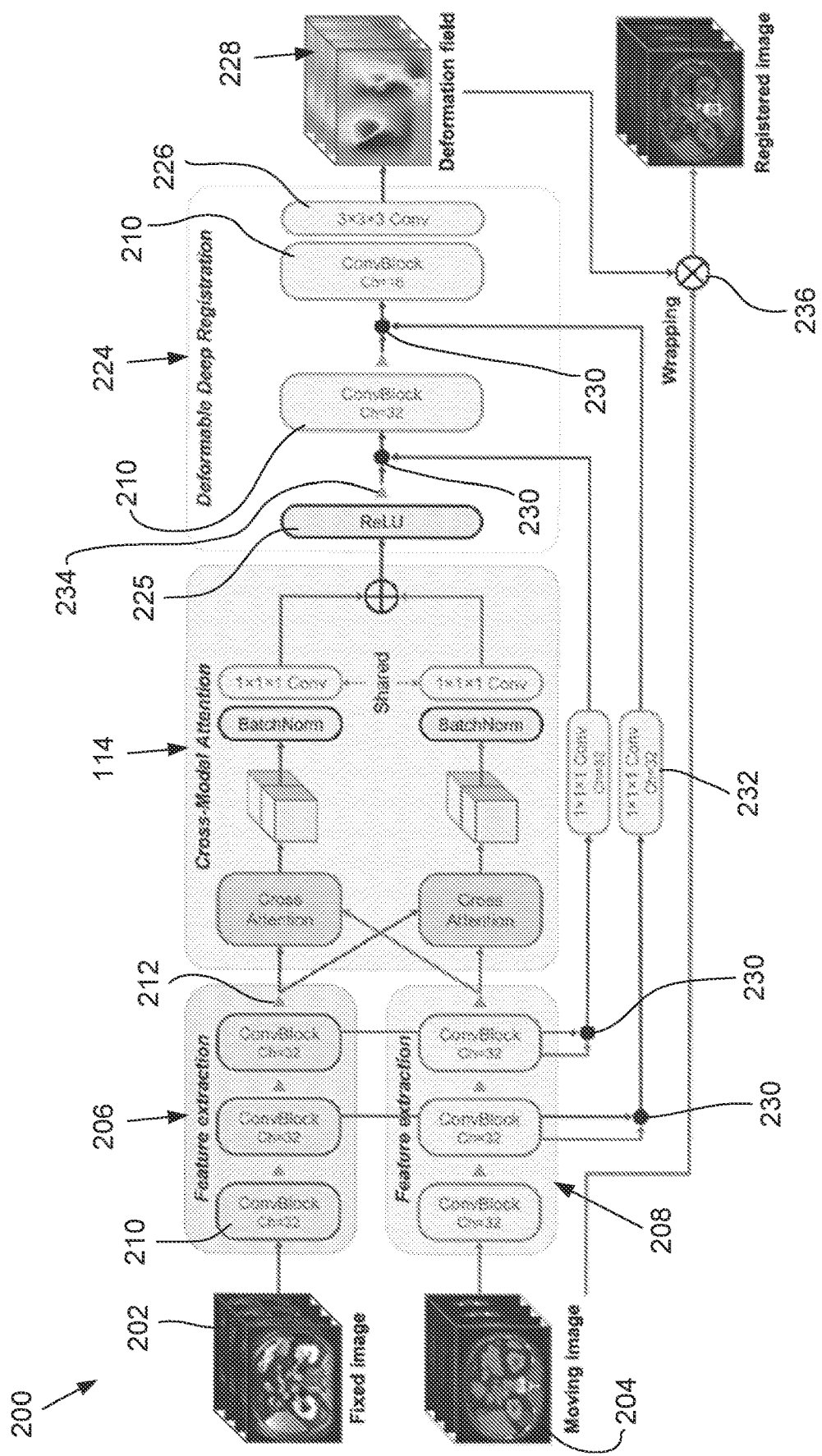
FIG. 4 is a flowchart schematic view of a multi-modal image registration network according to an exemplary embodiment of the present technology.

As shown in FIG. 4, a method of multi-modal image registration according to another exemplary embodiment of the present technology is generally designated by the numeral 200. The method 200 includes a fixed image 202 received from a first imaging device and a moving image 204 received from a second imaging device. In some embodiments, the first imaging device is an MRI device, and the fixed image is an MRI volume of a subject imaged by the MRI device. In some embodiments, the second imaging device is an ultrasound device, and the moving image is a TRUS volume of the subject. A first feature extractor 206 performs feature extraction on the fixed image 202 to generate a fixed image feature map. A second feature extractor 208 performs feature extraction on the moving image 204 to generate a moving image feature map. Each of the first and second feature extractors 206, 208 include convolution blocks 210 and 2×2×2 max pooling layers 212.

The fixed and moving image feature maps are input to the cross-modal attention module 114 to generate cross-modal feature attention data as discussed above regarding FIGS. 1-2 and method 100. As shown in FIG. 4, the cross-modal feature attention data is input to a deep registrator 224 that is configured to perform deformable deep registration on the cross-modal attention data to generate a predicted deformation field 228. The deep registrator 224 includes an ReLU 225, two convolution blocks 210, and a convolution layer 226. Each of the first and second feature extractors 206, 208 include three convolution blocks 210. The outputs of the third convolution blocks 210 of the feature extractors 206, 208 are input to a first channel-wise concatenation layer 230, the output of which is input to a first intermediate convolution layer 232, the output of which is input to a second channel-wise concatenation layer 230 with the output of the ReLU of the deep registrator 224. The outputs of the second convolution blocks 210 of the feature extractors 206, 208 are input to a third channel-wise concatenation layer 230, the output of which is input to a second intermediate convolution layer 232, the output of which is input to a fourth channel-wise concatenation layer 230 with the output of the first convolution block 210 of the deep registrator 224. In some embodiments, the deep registrator 224 includes 2×2×2 deconvolution and batch normalization and ReLU layers 234.

The method 200 includes performing a deformable registration implementation 236 on the predicted deformation field 228 to generate a multi-modal registered image. In the embodiment shown in FIG. 4, each convolution block 210 includes a first convolution layer, a first batch normalization and ReLU layer, a second convolution layer, and a second batch normalization and ReLU layer.

In some embodiments, the deformable registration module up-samples the outputs of the two cross-modal attention blocks into a full-size dense deformation field $\phi$. The predicted deformation field is then either applied to the moving image for inference, or the segmentation of the moving image for DICE supervision. Feature maps at different resolutions from the feature encoder are passed as residual connections to the registration decoder. Since two separate feature extractors/encoders are used, the residual connections are twice as large as the up-sampled feature map. To resolve this imbalance, the residual connections are first reduced to the same channel size as the up-sampled decoder feature maps with 1×1×1 convolution layers.

In some embodiments, method 200 is formulated as a deformable registration network and its performance evaluated on the Learn2Reg 2021 Abdomen CT-MR dataset. For fair benchmarking, the registration network is implemented within the Voxelmorph framework by replacing the U-Net backbone with the registration network of the present technology. Training is guided with DICE similarity loss and encourages smoothness with a diffusion regularizer on the spatial gradients of all displacements in the predicted deformation field. The weights for the two losses are 1.0 for DICE and 0.1 for smoothness for all experiments.

For training, the paired images from the training set and the auxiliary unpaired images are used. Data augmentation was conducted by performing rotation (±5 degrees around each axis), translation (±10 voxels in each direction), and isotropic scaling (±0.1) to both fixed and moving images. For all experiments on this dataset, Adam optimizer with learning rate of 1×10−4 for a maximum of 800 epochs was used.

The MSE loss used for network training does not directly describe the final registration quality. A clinically meaningful metric should focus on the position and orientation of the relevant organ. Therefore, the Surface Registration Error ("SRE") is used to evaluate the registration performance. Let X denote an MR prostate segmentation mesh containing n surface points x. Since the TRUS is treated as the moving image, both the ground truth $T_{gt}$ and the estimated transformation $T_{pred}$ register the TRUS to the MR. Thus, their inverse transformations, $T_{gt}^{-1}$ and $T_{pred}^{-1}$, are used to map the MR segmentation X to the TRUS space. The SRE is then formally defined as $$SRE = \frac{1}{n}\sum_{i=1}^{n} \left\| T_{gt}^{-1}(x_i) - T_{pred}^{-1}(X_i) \right\|_2 \quad (6)$$

Figure 5:
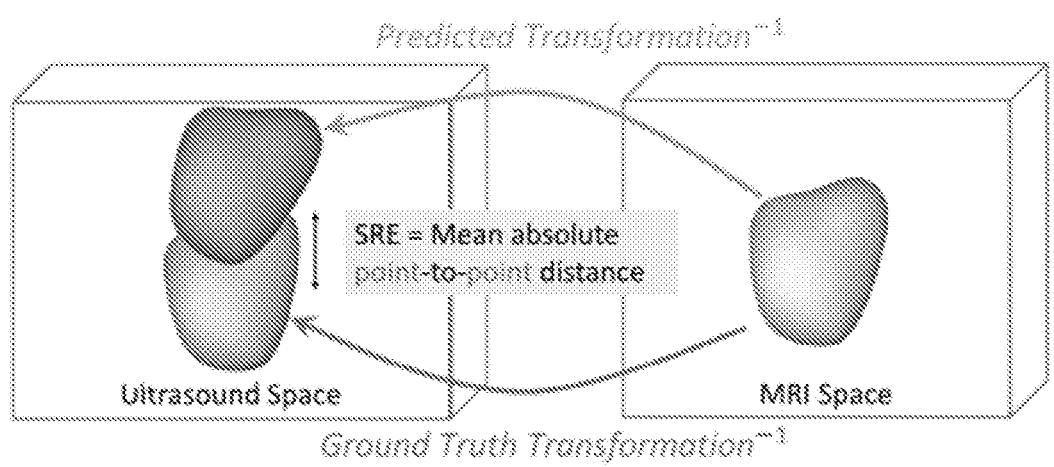
FIG. 5 is a schematic illustrating the Surface Registration Error ("SRE") calculation used in embodiments of the present technology.
Figure 6:
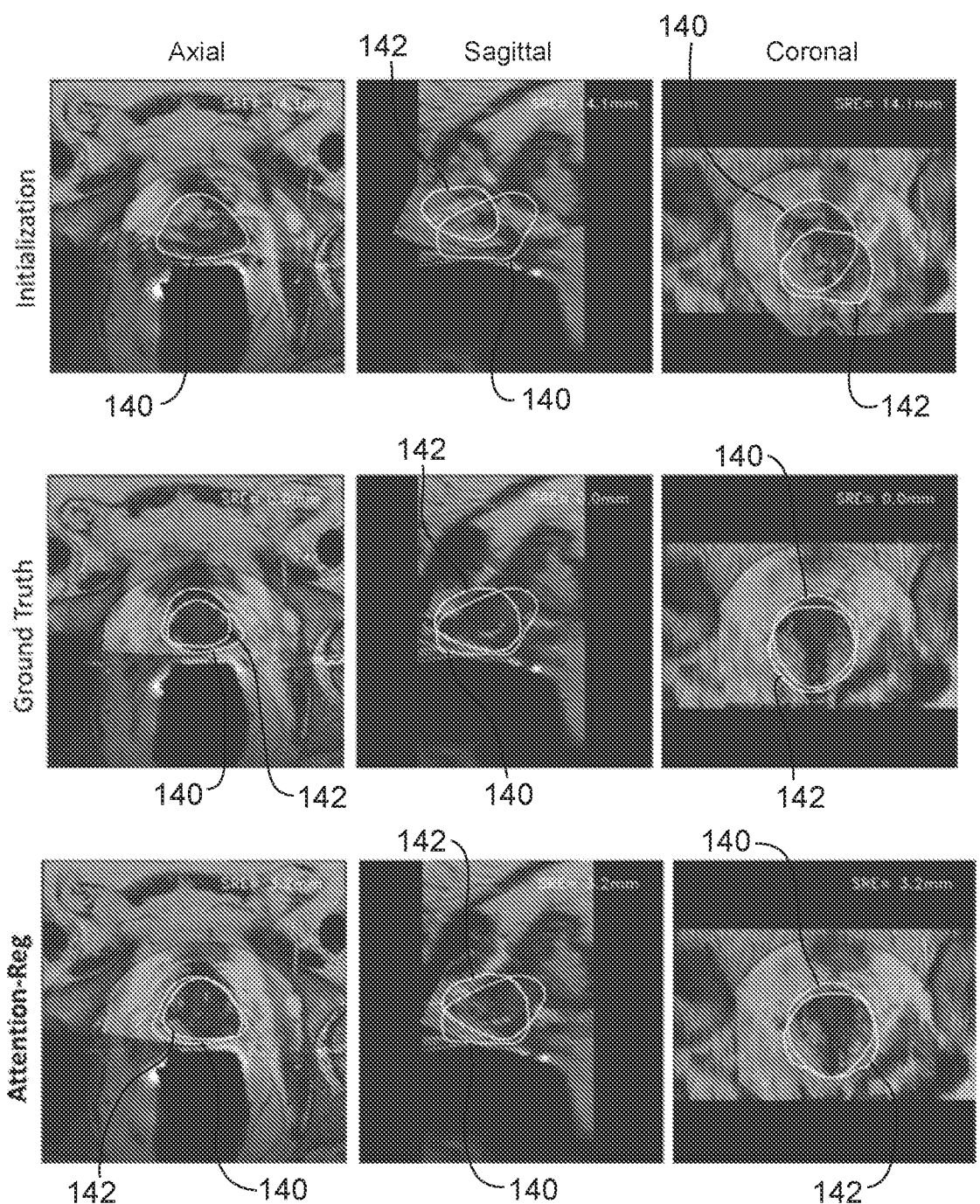
FIG. 6 shows images of registration results from an exemplary image registration method of the present technology.

The SRE describes the Euclidean point-to-point distance between the ground truth registered prostate and the prediction registered prostate, as illustrated in FIG. 5. FIG. 6 shows an exemplary test set to visualize the effect of registration according to methods 100, 200. The contour of MR prostate segmentation is labeled 140 and ultrasound segmentation is labeled 142. The SRE of each scenario is shown at the top-right corner of each image, and FIG. 6 shows that misalignment intensifies as the corresponding SRE grows.

Figure 7:
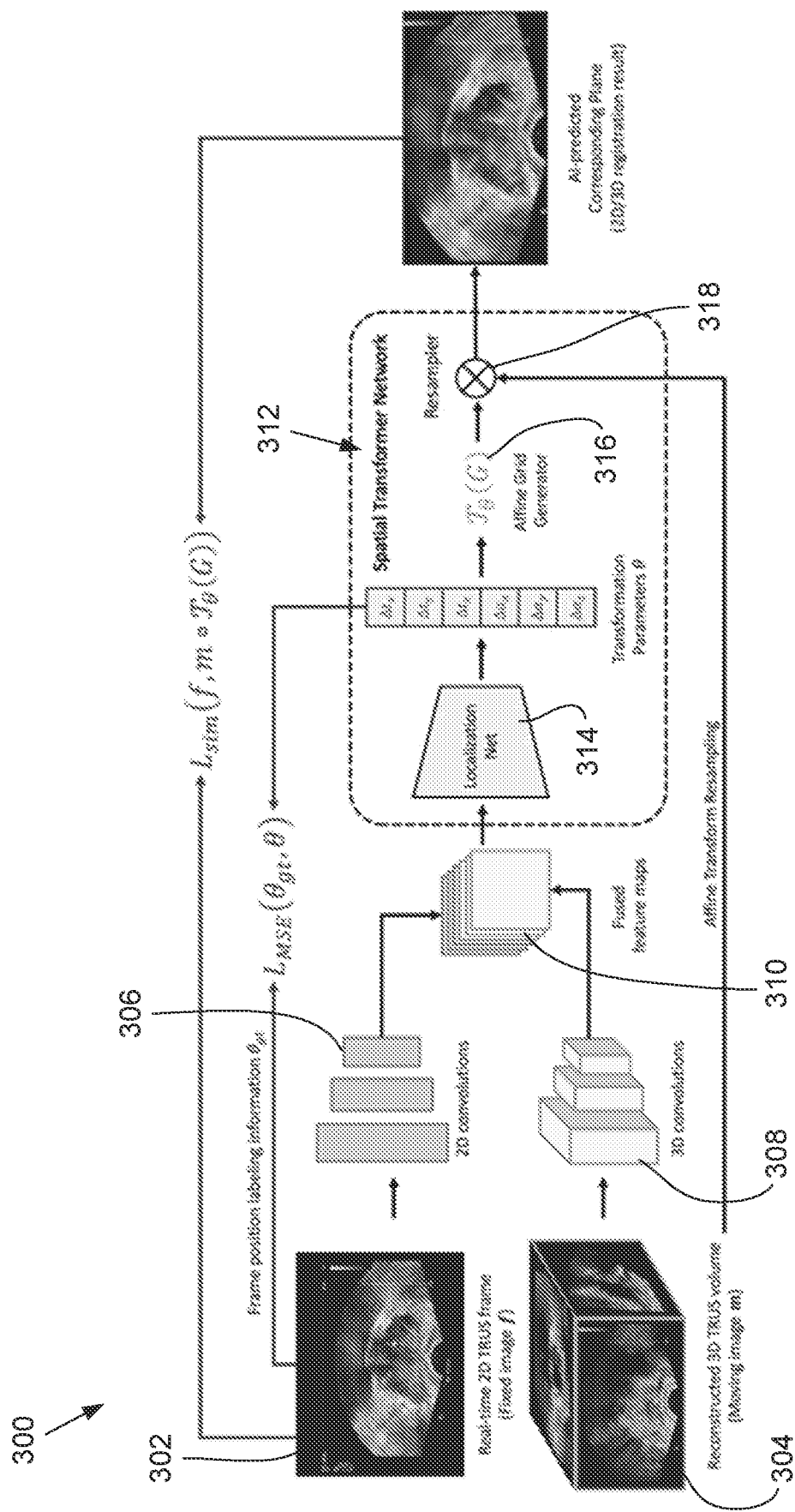
FIG. 7 is a flowchart schematic view of an end-to-end multi-dimensional image registration network according to an exemplary embodiment of the present technology.

As shown in FIG. 7, a method of multi-modal multi-dimensional image registration according to another exemplary embodiment of the present technology is generally designated by the numeral 300. The method 300 includes a fixed image 302 and a moving image 304. In some embodiments, the fixed image is a 2D TRUS frame of a subject imaged by an ultrasound device, and the moving image is a reconstructed 3D TRUS volume of the subject. Low-level features of the fixed image 302 are extracted via a plurality of 2D convolution layers 306. Low-level features of the moving image 304 are extracted via a plurality of 3D convolution layers 308. The low-level features of the fixed image 302 are concatenated with the low-level features of the moving image 304 in a late-fusion fashion to generate a fused feature map 310.

The fused feature map 310 is processed in a spatial transformation network ("STN") 312 to train an end-to-end multi-dimensional image registration. The STN 312 includes a localization network 314, a grid generator 316, and an image sampler 318. The localization network 314 is configured to determine the spatial relationships between the fused features of the fixed image 302 and the moving image 304 of the fused feature map 310. The grid generator 316 is configured to generate a transformed sampling grid. The image sampler 318 is configured to sample a target 2D plane from the 3D moving image 304.

In some embodiments, the method 300 includes receiving in real-time a second 2D ultrasound image, and receiving a 3D MRI volumetric image of the subject obtained from a MRI device. The second 2D ultrasound image is aligned in real-time to the 3D MRI volumetric image via the end-to-end multi-dimensional image registration to output a multi-modal multi-dimensional image registration. In some embodiments, the end-to-end multi-dimensional image registration is trained without the use of image tracking information.

Figure 8:
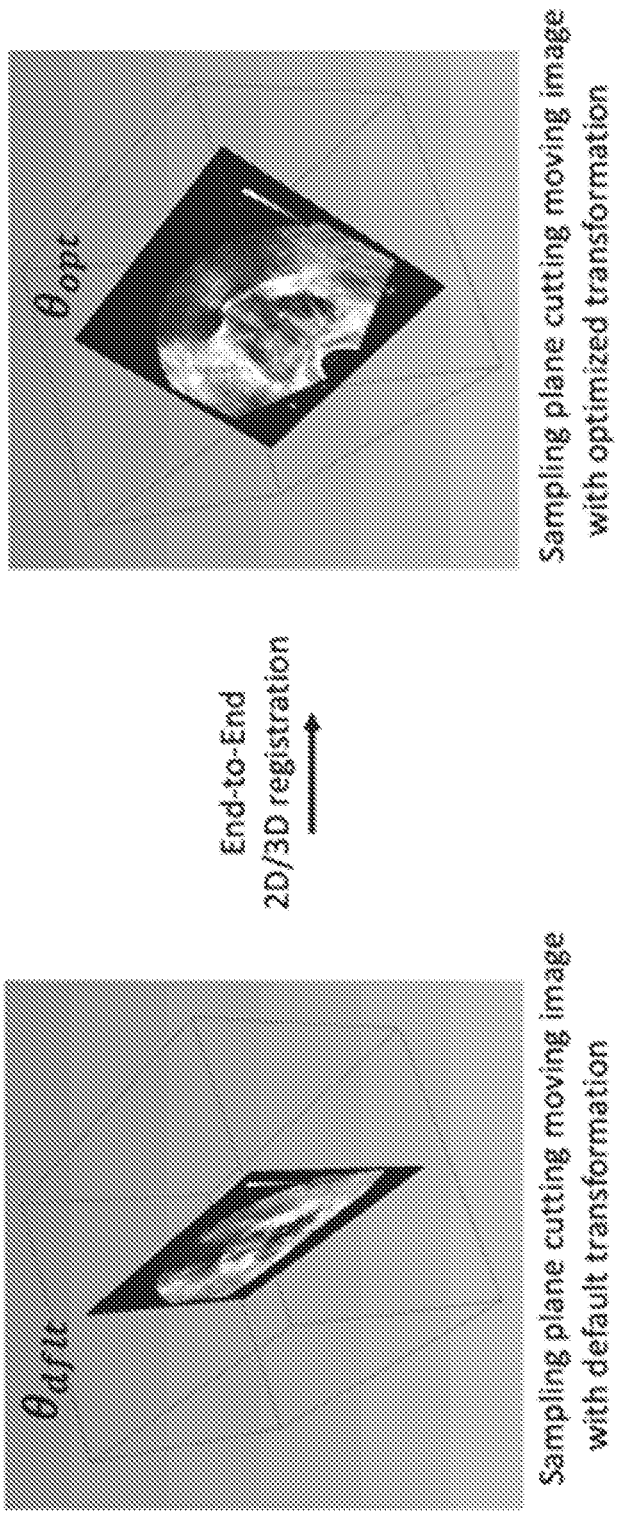
FIG. 8 shows exemplary sampling plane cutting moving images before and after the end-to-end image registration network of FIG. 7.
Figure 9:
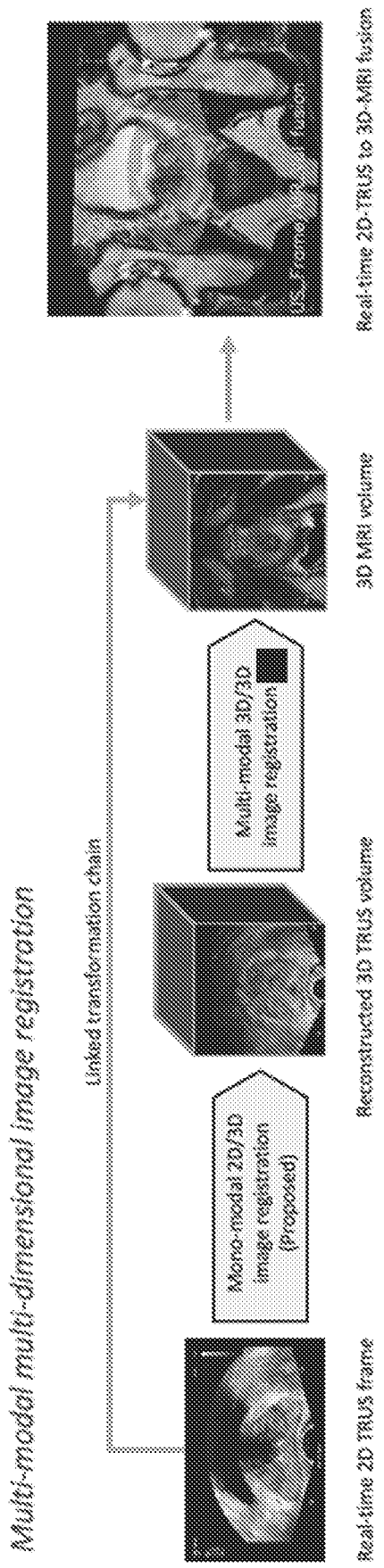
FIG. 9 is a flowchart schematic view of a multi-modal multi-dimensional image registration network according to an exemplary embodiment of the present technology.

Embodiments of the present technology, as shown in FIGS. 7-9, are directed to systems and methods for registering or aligning images in different dimensions (e.g. a 2D image to a 3D volumetric image) of different modalities using end-to-end machine learning-based techniques. The present technology learns to extract the correspondence information between 2D images and 3D volumes to estimate the relative transformation directly. This end-to-end machine learning method enables building a system to directly map a 2D image of one modality to a 3D volume of another modality. In some embodiments, the present technology utilizes image information only, and thus does not use external tracking devices.

In some embodiments, the method aligns a single 2D image or a sequence of 2D images to a 3D volumetric image through deep learning-based image registration. With no need for positioning information from tracking devices, the system gets the images registered using the image information solely. In the following apparatus description, the registration of 2D ultrasound images with 3D ultrasound volume is used to illustrate the technical details. It, however, does not limit the application of the present technology to ultrasound imaging only.

FIG. 7 depicts a method for the end-to-end 2D/3D image registration with a single pass according to an embodiment of the present technology. The architecture takes a 2D ultrasound frame and a 3D volume as the input for estimating the optimal sampling plane, cutting the 3D TRUS volume at the registered location.

In some embodiments, the end-to-end 2D/3D registration framework defines the real-time 2D ultrasound image frame as the fixed image f, and the reconstructed 3D ultrasound image volume as the moving image m. A set of parameters θ is used to define a sampling plane, which is used to cut a 2D plane from the 3D volume. The goal of the 2D/3D registration is to find to the optimal sampling plane defined by θ. The left-side image of FIG. 8 shows an initialized sampling plane cutting moving image with default transformation. After the 2D/3D registration, the right-side image of FIG. 8 shows the updated sampling plane cutting the 3D image volume from a different position, where the cross-sectional image matches the 2D TRUS frame input.

In some embodiments, the deep neural network for the registration task is built with a series of 2D convolutional layers to extract the low-level features from the input 2D image and with 3D convolutions for the input 3D image volume. Such design extracts representative image features from images in different dimensions.

In some embodiments, the features extracted from the two input branches are concatenated with each other in a late-fusion fashion and serve as the input to the localization-net for joint feature learning. The localization-net discovers the spatial relationship between the input frame and volume (e.g., finds the corresponding plane θ in 3D volume based on the contents of 2D frame). The rigid registration is used to illustrate the present technology for simplicity without loss of generality. There is no technical limitation of applying the present technology to non-rigid or deformable registration. In this exemplary embodiment, the localization-net's output θ contains 6 degrees of freedom $\{t_x, t_y, t_z, \alpha_x, \alpha_y, \alpha_z\}$, which refer to the translations and rotations along three axes.

In some embodiments, based on the localization-net's estimation θ, the customized affine grid generator generates a transformed sampling grid $\mathcal{T}_\theta(G)$. Together with the resampler component, the present technology samples a target 2D plane from the 3D input volume. This neural network predicted target plane is the result of the 2D/3D registration framework, and preferably contains the same information as the input 2D frame.

In some embodiments, the end-to-end training uses an unsupervised image similarity loss $L_{sim}$, which computes the similarity metric between the network predicted plane and the 2D frame input. This loss function can be implemented as the normalized cross-correlation loss, for example. In some embodiments, the backpropagation of this similarity loss is made possible by the characteristics of the spatial transformer network ("STN").

In embodiments having positioning information corresponding to each frame, the present technology additionally absorbs an auxiliary supervised loss $L_{MSE}$, which is the mean squared error loss between the localization-net's output θ and the ground truth positioning information $\theta_{gt}$.

Preferably, the 2D/3D image registration framework of the present technology is trained in an unsupervised manner, where no tracking information is needed. However, for data samples provided with tracking information, the present technology adds an auxiliary supervised loss to further improve the network's robustness.

In some embodiments, the 2D/3D image registration network is integrated into an image registration framework to further enable an end-to-end multi-modal multi-dimensional image registration workflow. FIG. 9 shows a process, according to embodiments of the present technology, for reconstructing 3D ultrasound volumes without tracking devices and aligning 3D TRUS volume with 3D pre-operative MRI volume. In some embodiments, the system automatically aligns the 3D TRUS volume with the 3D pre-operative MRI volume. In some embodiments, after establishing the correspondence between the real-time 2D TRUS frames and the reconstructed 3D TRUS volume, a transformation chain is formed to link the 2D TRUS frames to the 3D MRI volume. Upon this step, embodiments of the present technology build a system to directly map a 2D image of one modality to a 3D volume of another modality, thus achieving a multi-modal multi-dimensional image registration.

In some embodiments, the alignment between 3D TRUS with 3D pre-operative MRI is performed with a deep neural network with cross-modal attention modules as described above regarding registration networks and methods 100, 200. In some embodiments, the above mentioned cross-modal attention network is accompanied by the contrastive pre-training method described above.

In some embodiments, the method includes a modification of the STN, which realizes the end-to-end 2D/3D image registration through the combination of three components: 1) a localization network predicting the transformation parameters according to the input fixed and moving image pair, 2) a grid generator creating a sampling grid using the predicted transformation parameters, and 3) a sampler producing the wrapped image by resampling the moving image at each point location defined in the sampling grid. These three components are discussed in more detail below.

In some embodiments, the localization network quantitatively estimates the transformation from the fixed image coordinates to the moving image coordinates according to their image information. Therefore, it is naturally designed as a regression network, taking input as the fixed/moving image pair and outputting the transformation parameters. The network architecture can take any form of convolutional neural networks, but the last layer is preferably a regression layer (e.g., sigmoid layer) with N output nodes, representing the N parameters of the transform matrix. Embodiments of the present technology use a 2D convolutional neural network as the localization network to regress N=6 parameters describing a 3D affine transform from the fixed image space to the moving image space.

In some embodiments, a sampling grid with the same size of the fixed image is defined to wrap the moving image to the fixed image space by the predicted affine transform. Each element in the sampling grid represents a wrapped image pixel, whose sampling location in the moving image space can be calculated by the following coordinate transform:

$$\begin{bmatrix} x_i^s \\ y_i^s \\ z_i^s \end{bmatrix} = M_{3\times 4} \begin{bmatrix} x_i^t \\ y_i^t \\ z_i^t \\ 1 \end{bmatrix} = \begin{bmatrix} \theta_{11} & \theta_{12} & \theta_{13} & \theta_{14} \\ \theta_{21} & \theta_{22} & \theta_{23} & \theta_{24} \\ \theta_{31} & \theta_{32} & \theta_{33} & \theta_{34} \end{bmatrix} \begin{bmatrix} x_i^t \\ y_i^t \\ z_i^t \\ 1 \end{bmatrix} \quad (7)$$

where $(x_i^t, y_i^t, z_i^t)$ and $(x_i^s, y_i^s, z_i^s)$ are the coordinates of the i-th pixel in the wrapped image and the corresponding sampling location in the moving image, respectively. The 12 elements of the affine matrix $M_{3\times 4}$ are predicted by the localization network discussed above.

In some embodiments, the intensity at a particular pixel in the wrapped image is determined by applying bilinear interpolation at each point location defined by the sampling gird, giving the following equation:

$$I_i^t = \sum_d^D \sum_h^H \sum_w^W I_{dhw}^s \cdot \max(0, 1-|x_i^s - w|) \cdot \max(0, 1-|y_i^s - h|) \cdot \max(0, 1-|z_i^s - d|) \quad (8)$$

where $I_i^t$ denotes interpolated intensity at the i-th pixel of the wrapped image, and $I_{dhw}^s$ is the intensity at location (w, h, d) of the moving image, whose size is W×H×D. Based on the above equation, embodiments of the technology define the sub-gradients at each wrapped image pixel value $I_i^t$ with respect to the sampling coordinates $(x_i^s, y_i^s, z_i^s)$ as follows:

$$\frac{\partial I_i^t}{\partial x_i^s} = \qquad (9)$$

$$\sum_d^D \sum_h^H \sum_w^W I_{dhw}^s \cdot \max(0, 1-|y_i^s - h|) \cdot \max(0, 1-|z_i^s - d|) \cdot f(x_i^s)$$

where $$f(x_i^s) = \begin{cases} 0, & \text{if } |x_i^s - w| \geq 1; \\ 1, & \text{if } |x_i^s - w| < 1 \text{ and } x_i^s \leq w \\ -1, & \text{if } |x_i^s - w| < 1 \text{ and } x_i^s > w \end{cases} \quad (10)$$

For brevity, only the partial derivative of $$\frac{\partial I_i^t}{\partial x_i^s}$$

is shown. The partial derivatives $$\frac{\partial I'_i}{\partial y_i^s} \text{ and}$$

$$\frac{\partial I'_i}{\partial z_i^s}$$

are similar to $$\frac{\partial I'_i}{\partial x_i^s}.$$

Through the partial derivative, the loss gradients are back-propagated to the sampling grid coordinates, and furthermore, to the affine transformation parameters and the localization network. This makes the entire pipeline of the STN differentiable and trainable in an end-to-end manner.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories ("CD-ROMs"), compact disk rewritables ("CD-RWs"), and magneto-optical disks, semiconductor devices such as read-only memories ("ROMs"), random access memories ("RAMs") such as dynamic and static RAMs, erasable programmable read-only memories ("EPROMs"), electrically erasable programmable read-only memories ("EEPROMs"), flash memories, magnetic or optical cards, or any type of storage devices suitable for storing electronic instructions. The processor and/or storage device may be included in or in communication with the imaging devices, such as an MRI device and an ultrasound device, such that the registration networks associated with methods 100, 200, 300 form registration systems.

As will be apparent to those skilled in the art, various modifications, adaptations, and variations of the foregoing specific disclosure can be made without departing from the scope of the technology claimed herein. The various features and elements of the technology described herein may be combined in a manner different than the specific examples described or claimed herein without departing from the scope of the technology. In other words, any element or feature may be combined with any other element or feature in different embodiments, unless there is an obvious or inherent incompatibility between the two, or it is specifically excluded.

References in the specification to "one embodiment," "an embodiment," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition, or step being referred to is an optional (not required) feature of the technology.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about." The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents of carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third, and upper third, etc.

As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the technology encompasses not only the entire group listed as a whole, but each member of the group individually and all possible subgroups of the main group. Additionally, for all purposes, the technology encompasses not only the main group, but also the main group absent one or more of the group members. The technology therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A method of multi-modal image registration, the method comprising:
   receiving as input a fixed image from a first imaging device;
   receiving as input a moving image from a second imaging device;
   performing feature extraction on the fixed image via a first feature extractor to generate a fixed image feature map;
   performing feature extraction on the moving image via second feature extractor to generate a moving image feature map;
   performing cross-modal attention on the fixed image feature map and the moving image feature map to generate cross-modal feature attention data;
   performing deep registration on the cross-modal feature attention data via a deep registrator; and
   outputting a multi-modal registered image.

2. The method of claim 1, wherein the first imaging device is a magnetic resonance imaging ("MRI") device, and the fixed image is an MRI volume of a subject.

3. The method of claim 1, wherein the second imaging device is an ultrasound device, and the moving image is a transrectal ultrasound volume of a subject.

4. The method of claim 1, wherein performing the cross-modal attention comprises:
   inputting the fixed image feature map as a primary input into a first cross-modal attention block and inputting the moving image feature map as a cross-modal input into the first cross-modal attention block to generate a first cross-modal attention block output;
   inputting the moving image feature map as a primary input into a second cross-modal attention block and inputting the fixed image feature map as a cross-modal input into the second cross-modal attention block to generate a second cross-modal attention block output;
   inputting the first cross-modal attention block output into a common convolution layer to generate a first cross-modal attention convolution output;
   inputting the second cross-modal attention block output into the common convolution layer to generate a second cross-modal attention convolution output; and
   performing element-wise addition on the first cross-modal attention convolution output and the second cross-modal attention convolution output to generate the cross-modal feature attention data.

5. The method of claim 4, wherein each of the first cross-modal attention block and the second cross-modal attention block are configured to perform a first matrix multiplication of the primary input and the cross-modal input to generate a first matrix output, perform a second matrix multiplication of the primary input and the first matrix output to generate a second matrix output, and perform a concatenation of the cross-modal input and the second matrix output to generate the respective cross-modal attention block output.

6. The method of claim 5, wherein the concatenation comprises a plurality of channels, and features of the fixed image feature map are arranged in a first half of the plurality of channels and features of the moving image feature map are arranged in a last half of the plurality of channels.

7. The method of claim 1, wherein the deep registrator is configured to perform rigid deep registration on the cross-modal feature attention data to generate an estimated transformation data, the deep registrator comprising a rectified linear unit, two convolution blocks, and three fully connected layers.

8. The method of claim 7, further comprising performing a rigid registration implementation on the estimated transformation data to generate the multi-modal registered image.

9. The method of claim 7, wherein each of the first feature extractor and the second feature extractor comprise two convolution blocks.

10. The method of claim 9, wherein each convolution block comprises a convolution layer and a batch normalization and rectified linear unit layer.

11. The method of claim 1, wherein the deep registrator is configured to perform deformable deep registration on the cross-modal feature attention data to generate a predicted deformation field, the deep registrator comprising a rectified linear unit, a first convolution block, a second convolution block, and a convolution layer.

12. The method of claim 11, wherein each of the first feature extractor and the second feature extractor comprise a first convolution block, a second convolution block, and a third convolution block, and wherein performing the deep registration further comprises:
   performing a first channel-wise concatenation of the outputs of the third convolution blocks of the first feature extractor and the second feature extractor;
   inputting the output of the first channel-wise concatenation through a first intermediate convolution layer; and
   performing a second channel-wise concatenation of the outputs of the first intermediate convolution layer and the rectified linear unit of the deep registrator.

13. The method of claim 12, wherein performing the deep registration further comprises:
   performing a third channel-wise concatenation of the outputs of the second convolution blocks of the first feature extractor and the second feature extractor;
   inputting the output of the third channel-wise concatenation through a second intermediate convolution layer; and
   performing a fourth channel-wise concatenation of the outputs of the second intermediate convolution layer and the first convolution block of the deep registrator.

14. The method of claim 12, wherein each convolution block comprises a first convolution layer, a first batch normalization and rectified linear unit layer, a second convolution layer, and a second batch normalization and rectified linear unit layer.

15. The method of claim 11, further comprising performing a deformable registration implementation on the predicted deformation field to generate the multi-modal registered image.

* * * * *